(12) United States Patent
Zhu et al.

(10) Patent No.: US 8,279,875 B2
(45) Date of Patent: Oct. 2, 2012

(54) METHOD AND APPARATUS FOR ETHERNET TO BEAR ATM CELLS

(75) Inventors: Mingming Zhu, Shenzhen (CN);
Suping Zhai, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 554 days.

(21) Appl. No.: 12/348,148

(22) Filed: Jan. 2, 2009

(65) Prior Publication Data

US 2009/0116493 A1  May 7, 2009

Related U.S. Application Data

(63) Continuation of application No. PCT/CN2007/070112, filed on Jun. 14, 2007.

(30) Foreign Application Priority Data

Jul. 3, 2006  (CN) .......................... 2006 1 0090170

(51) Int. Cl.
  *H04L 12/28* (2006.01)
  *H04J 3/16* (2006.01)
  *H04J 3/24* (2006.01)

(52) U.S. Cl. .................. 370/395.5; 370/395.3; 370/466; 370/473

(58) Field of Classification Search .......................... None
See application file for complete search history.

(56) References Cited

U.S. PATENT DOCUMENTS

| 5,444,703 | A | * | 8/1995 | Gagliardi et al. ............. 370/401 |
| 5,457,681 | A | * | 10/1995 | Gaddis et al. ................. 370/402 |
| 6,512,773 | B1 | * | 1/2003 | Scott ......................... 370/395.61 |
| 2005/0157729 | A1 | * | 7/2005 | Rabie et al. .............. 370/395.53 |
| 2005/0169279 | A1 | * | 8/2005 | Magd et al. ................. 370/395.5 |
| 2005/0281267 | A1 | | 12/2005 | McFadden et al. |
| 2007/0098006 | A1 | * | 5/2007 | Parry et al. ..................... 370/437 |

FOREIGN PATENT DOCUMENTS

| CN | 1503514 A | 6/2004 |
| CN | 1529476 A | 9/2004 |
| CN | 1571395 A | 1/2005 |
| KR | 2001-0077397 | 8/2001 |
| WO | 98/43396 | 10/1998 |

OTHER PUBLICATIONS

Yang, Wan-chun "Multi-Service Transport Platform Embedded with MPLS" China Academic Journal; Mar. 31, 2005; pp. 28-30.

(Continued)

*Primary Examiner* — John Blanton
*Assistant Examiner* — Thinh Tran
(74) *Attorney, Agent, or Firm* — Brinks Hofer Gilson & Lione (57) ABSTRACT

A method for an Ethernet to bear ATM cells includes: mapping the ATM virtual connection information in the first ATM cell received from the ATM network to an Interworking Identifier (IW ID); combining the IW ID and the cell payload of the first ATM cell into an Ethernet frame; and transmitting the Ethernet frame in an Ethernet network. An apparatus for an Ethernet to bear ATM cells is also disclosed. The embodiments of the present invention implement network interworking on the data link layer (layer 2) and enable an ATM network to perform ATM emulation in a metropolitan area Ethernet (MEN) independently of the upper-layer protocol, thus facilitating the user.

18 Claims, 7 Drawing Sheets

OTHER PUBLICATIONS

Gu, Gang "The Research and Implementation of Interconnection Between Ethernet MAN based on ATM Technology" China Academic Journal; Feb. 28, 2006; pp. 50-52.

International Search Report issued in corresponding PCT Application No. PCT/CN2007/070112; mailed Sep. 20, 2007.

Zhu, Mingming "ATM over Ethernet Application" ITU-T Draft Study Period 2005-2008 International Telecommunication Union. vol. Study Group 13. Geneva; CH, Jul. 17, 2006.1-4.

Roberts, Lawrence G. "Request for Coordination of Cells in Frames Specification" Jan. 20, 2004 <http://www.ziplink.net/~lroberts/Atmf-961104.html>.

Supplementary European Search Report issued in corresponding European Patent Application No. 07 72 1733; mailed May 8, 2009.

Written Opinion of the International Searching Authority issued in corresponding PCT Patent Application No. PCT/CN2007/070112, mailed Sep. 20, 2007.

Office Action issued in corresponding European Patent Application No. 07721733.9, mailed Feb. 2, 2010.

Martini et al., "Encapsulation Methods for Transport of ATM Over MPLS Networks", Network Working Group, Sep. 2005.

Bryant et al., "Pseudo wire Emulation Edge-to-Edge (PWE3) Architecture", Network Working Group. The Internet Society, Mar. 2005.

International Telecommunication Union, "ATM-MPLS Network Interworking—Cell Mode User Plane Interworking", Series Y: Global Information Infrastructure and Internet Protocol Aspects. Y.1411, Feb. 2003.

IEEE Computer Society, "Virtual Bridged Local Area Networks", IEEE Standards for Local and Metropolitan Area Networks. IEEE Std 802.1Q, 2003 Edition, May 7, 2003.

IEEE Computer Society, "Media Access Control (MAC) Bridges", IEEE Standards for Local and Metropolitan Area Networks. IEEE Std. 802.1D-2004, Jun. 9, 2004.

IEEE Computer Society, "Virtual Bridged Local Area Networks—Amendment 4: Provider Bridges", Draft Standard for Local and Metropolitan Area Networks. IEEE P802.1ad/D6.0, Aug. 17, 2005.

IEEE Computer Society, "Virtual Bridged Local Area Networks—Amendment 6: Provider Backbone Bridges", Draft Standard for Local and Metropolitan Area Networks. IEEE P802.1ah/D4.2, Mar. 26, 2008.

* cited by examiner

METHOD AND APPARATUS FOR ETHERNET TO BEAR ATM CELLS

FIELD OF THE INVENTION

The present relates to the Ethernet technology, and in particular, to a method and an apparatus for an Ethernet to Bear Asynchronous Transfer Mode (ATM) cells.

BACKGROUND

With the development of the Ethernet technology, operators can use Ethernet technologies in a Metropolitan Area Network (MAN) directly to provide various services. The development of diversified services spurs the Ethernet to evolve to carrier-class Ethernets of higher reliability. In this process, the Ethernet needs to interwork with other networks. In the conventional art, the ATM network is interconnected with the Ethernet by bearing Ethernet services on the ATM network to implement Local Area Network Emulation (LANE) over ATM. With the Ethernet evolving to a core of the MAN, the ATM network needs to be connected into an Ethernet to implement ATM emulation.

ATM is a cell-based communication technology, in which all data switching units are based on an information block of a fixed length, namely, a cell. Each cell is 53 bytes in length, and consists of 48-byte cell payload and 5-byte cell header.

Table 1 shows the structure of an ATM cell header of a Network/Network Interface (NNI).

TABLE 1

| 8 | 7 | 6 | 5 | 4 | 3 | 2 | 1 |
|---|---|---|---|---|---|---|---|
| | | | VPI | | | | |
| VPI | | | | VCI | | | |
| | | VCI | | | | | |
| VCI | | | | PTI | | | CLP |
| | | | HEC | | | | |

As shown in Table 1, an ATM cell header contains: 12-bit Virtual Path Identifier (VPI), 16-bit Virtual Channel Identifier (VCI), 3-bit Payload Type Identifier, 1-bit Cell Loss Priority (CLP), and 8-bit Header Error Control (HEC).

Before transmitting byte streams, the ATM network needs to set up an end-to-end virtual connection, namely, a Virtual Path (VP) with a VPI or a Virtual Connection (VC) with a VCI. The VP is allocated, and occupies a certain number of network resources. Only the virtual connection within a VP needs to occupy resources of a VP dynamically through signaling. Besides, cell loss is inevitable in an ATM network. A CLP can be set for a cell. When the network is congested, the cell whose CLP is set to "1" may be discarded first.

Table 2 shows the format of an 802.1-based Ethernet frame, in which a Destination Address (DA), Source Address (SA), frame Length (LEN), payload type (TYPE), Frame Check Sequence (FCS), Ethernet user bridge network tag (C-TAG), metropolitan area Ethernet service instance tag (S-TAG), and backbone Ethernet service instance tag (I-TAG) are included. For detailed description about the fields, see the IEEE802.1d, IEEE802.1q and IEEE802.1ah protocol files.

TABLE 2

| 802.1d | | | | |
|---|---|---|---|---|
| 6 bytes | 6 bytes | 2 bytes | N bytes | 4 bytes |
| DA | SA | LEN/TYPE | Payload | FCS |

TABLE 2-continued

| 802.1q | | | | | |
|---|---|---|---|---|---|
| 6 bytes | 6 bytes | 4 bytes | 2 bytes | N bytes | 4 bytes |
| DA | SA | C-TAG | LEN/TYPE | Payload | FCS |
| 802.1ah | | | | | |
| 6 bytes | 6 bytes | 4 bytes | 6 bytes | N bytes | 4 bytes |
| DA | SA | S-TAG | I-TAG | Payload | FCS |

As shown in Table 2, a 4-byte C-TAG contains a 2-byte Type Protocol ID (TPID) and a 2-byte Virtual Local Area Network Tag (VLAN TAG); a 6-byte I-TAG contains a 2-byte TPID and a 3-byte backbone Ethernet instance service identifier (I-SID).

The Pseudo Wire Emulation Edge-to-Edge (PWE3) workgroup of the Internet Engineering Task Force (IETF) is engaged in researching different types of PWE3 on a Packet Switched Network (PSN). The emulated services can be transmitted through a frame relay, Ethernet, ATM or Time Division Multiplex (TDM) dedicated line.

The PWE3 can use a tunnel mechanism on the PSN to simulate the attributes required by a service, in which the tunnel is called a Pseudo Wire (PW). The PWE3 serves to package the Protocol Data Units (PDUs) of a specific service. A PDU contains the data and control information required for simulating specific services. By using a PWE3 mechanism, the operator may transfer all transmission services to an integrated network such as an Internet Protocol/Multi-Protocol Label Switching (IP/MPLS) network. A universal PWE3 package generally contains four parts: header of the PSN, pseudo wire identifier, control word and PDU. For the PWE3 reference model, see the IETF PWE3 rfc3985 protocol document.

The International Telecom Union (ITU) document "ITU-T Y.1411" specifies the format of an ATM cell package of an NNI on an MPLS network.

TABLE 3

MPLS tunnel label (4N bytes)
PW label (4 bytes)
Control word (4 bytes)
Payload

The 32-bit structure of the control word in Table 3 is: 2-bit zero information, 14-bit length (LEN) and 16-bit sequence number (SN), where LEN and SN are optional and can be set to zero if they are not selected.

In the process of packaging ATM cells, one ATM cell may be mapped to one Ethernet frame, which is called "one-to-one mode"; or multiple ATM cells are mapped to one Ethernet frame, which is called "N-to-one mode". The length of an ATM cell is 53 bytes fixedly. Therefore, ATM cells may be packaged in two ways:

single-cell package: one cell is packaged in an MPLS packet; and package of connected cells: multiple cells are packaged in an MPLS packet. A package of connected cells may be generated by repeating the single-cell package format in the payload area of an Ethernet frame.

Table 4-1 shows the NNI single-cell package format of the one-to-one mode. A package of connected cells of the one-to-one mode can be generated by repeating the single-cell package format of the one-to-one mode in the payload area of an Ethernet frame.

TABLE 4-1

| 8 | 7 | 6 | 5 | 4 | 3 | 2 | 1 |
|---|---|---|---|---|---|---|---|
| MODE | VCIP | 0 | 0 | PTI | | | CLP |
| VCI (optional) | | | | | | | |
| VCI (optional) | | | | | | | |
| ATM payload (48 bits) | | | | | | | |

As shown in Table 4-1, the 1-bit MODE indicates the packaging mode; if MODE=0, the packaging mode is cell packaging; if MODE=1, the packaging mode is frame packaging.

As shown in Table 4-1, the 1-bit VCIP indicates whether a VCI is included in a payload package.

If VCIP=0, it indicates that no VCI is included in a payload package. In this case, the package format contains no 16-bit VCI area shown in Table 4-1.

If VCIP=1, it indicates a VCI is included in a payload package. In this case, the package format contains a 16-bit VCI area, which comes in two circumstances: (i) the first ATM cell is packaged in an Ethernet frame; (ii) the VCI of the currently packaged ATM cell in an Ethernet frame is different from the VCI of the previously packaged ATM cell in the Ethernet frame.

Table 4-2 shows the NNI single-cell package format of the N-to-one mode. A package of connected cells of the N-to-one mode can be generated by repeating the single-cell package format of the N-to-one mode in the payload area of an Ethernet frame. One PW may bear more than one ATM Virtual Channel Connection (VCC) or Virtual Path Connection (VPC). Therefore, a payload package needs to contain a VPI and a VCI.

TABLE 4-2

| 8 | 7 | 6 | 5 | 4 | 3 | 2 | 1 |
|---|---|---|---|---|---|---|---|
| VPI | | | | | | | |
| VPI | | | | VCI | | | |
| VCI | | | | | | | |
| VCI | | | | PTI | | | CLP |
| ATM payload (48 bits) | | | | | | | |

However, the research object of the PWE3 workgroup is limited to PSNs based on IP or MPLS. However, an Ethernet is a connectionless packet-based network, which is different from IP- or MPLS-based networks.

In conventional art, a method for interworking between the Ethernet and the ATM network is provided that refers to the contents about service interworking between the Ethernet and the ATM network in the IEEE 802.1 protocol (802.1d, 802.1q and 802.1ah protocol). The network model of the method in the conventional art is shown in FIG. 1.

Figure 1:
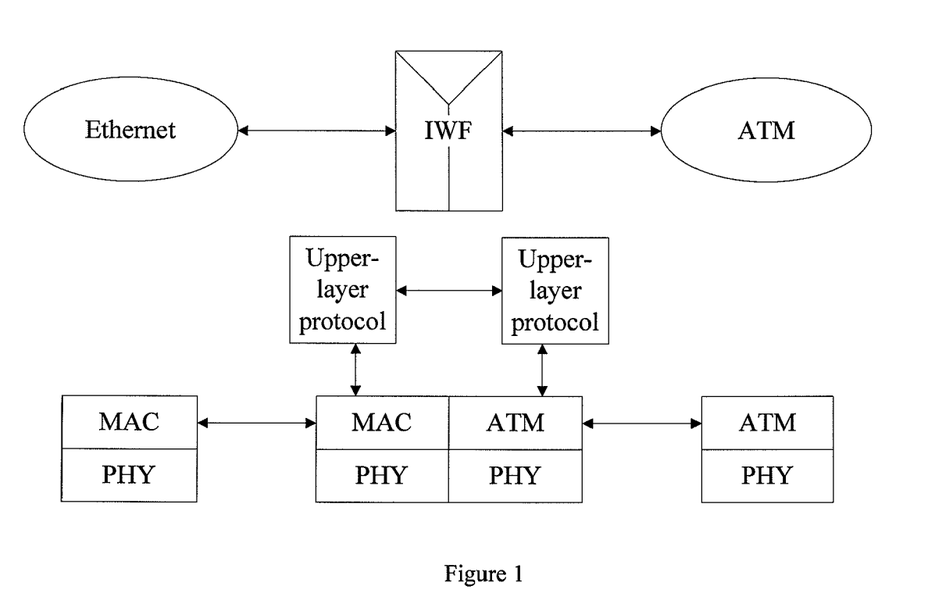
FIG. 1 shows a network model in the second conventional art.

As shown in FIG. 1, when the Interworking Function (IWF) between an Ethernet network and an ATM network handles an Ethernet frame or ATM cell, the Ethernet frame or the ATM cell cannot be converted directly on layer 2, but has to be converted through an upper-layer protocol.

The interworking between different types of networks comes in two types: network interworking and service interworking. In network interworking, two terminal networks use the same protocol, and different protocols are used between the central network and the terminal network; and the existence of the network in the central location is transparent to the users at both sides. In service interworking, different protocols may be used between two terminal networks, and peer-to-peer communication is performed between them. However, the peer-to-peer communication requires assistance of the upper-layer protocol.

The conventional art implements conversion between an ATM cell and an Ethernet frame through the processing based on the upper-layer protocol from the perspective of service interworking. The upper-layer protocol over the ATM network is IP protocol, the IWF from the ATM to the Ethernet can strip the IP packet from the ATM cell, package the IP packet into the Ethernet frame and send it to the Ethernet; the IWF from the Ethernet to the ATM can strip the IP packet from the Ethernet frame, package the IP packet into the ATM cell and send it to the ATM network.

The interconnection between two networks from the perspective of service interworking in the conventional art ultimately relies on the conversion between different layers of the Open System Interconnection (OSI) model. That is, in order for the IWF to strip the upper-layer protocol packets from the ATM network or the Ethernet or to package such packets, the IWF needs to learn the type of the upper-layer protocol in addition to the ATM cell format and the Ethernet frame format.

SUMMARY

Embodiments of the present invention provide a method and apparatus for an Ethernet to bear ATM cells, which enables an ATM network to implement ATM emulation in a metropolitan area Ethernet network (MEN) in the layer-2 protocol.

Technical solutions provided by the embodiments of the present invention are as follows:

A method for an Ethernet to bear ATM cells includes:

mapping ATM virtual connection information in a first ATM cell received from an ATM network to an interworking identifier (IW ID);

combining the IW ID with cell payload of the first ATM cell into an Ethernet frame; and transmitting the Ethernet frame in an Ethernet network.

An apparatus for an Ethernet to bear ATM cells includes:

a first module, adapted to map a VPI and a VCI in a first ATM cell received from an ATM network to an IW ID;

a second module, adapted to combine the IW ID with cell payload of the first ATM cell into an Ethernet frame; and a third module, adapted to transmit the Ethernet frame in an Ethernet network.

An apparatus for an Ethernet to bear ATM cells, adapted to receive Ethernet frames, in which an Ethernet frame is adapted to bear cell payload of a first ATM cell and an IW ID obtained from mapping of a VPI and a VCI of the first ATM cell. The apparatus includes:

a first module, adapted to inversely map the IW ID in the Ethernet frame to a VPI and a VCI; and a second module, adapted to: retrieve the cell payload of the first ATM cell from the Ethernet frame; form a second ATM cell that contains the cell payload of the first ATM cell, the VPI and VCI; and send the second ATM cell to the ATM network.

Therefore, the method and the apparatus for an Ethernet to bear ATM cells under the present invention enable an ATM network to implement ATM emulation in a MEN. The present invention is based on the PW mapping technology, and implements network interworking of the data link layer (layer 2) independently of the upper-layer protocol. That is, the interworking is completely transparent to the upper-layer protocol type, thus facilitating the user.

BRIEF DESCRIPTION OF THE DRAWINGS

FIG. 2-1 shows a network model of the one-to-one mode in an embodiment of the present invention;

FIG. 2-2 shows a network model of the N-to-one mode in an embodiment of the present invention;

DETAILED DESCRIPTION

The technical solution under the present invention is hereinafter described in detail by reference to the accompanying drawings and preferred embodiments.

Figure 2:
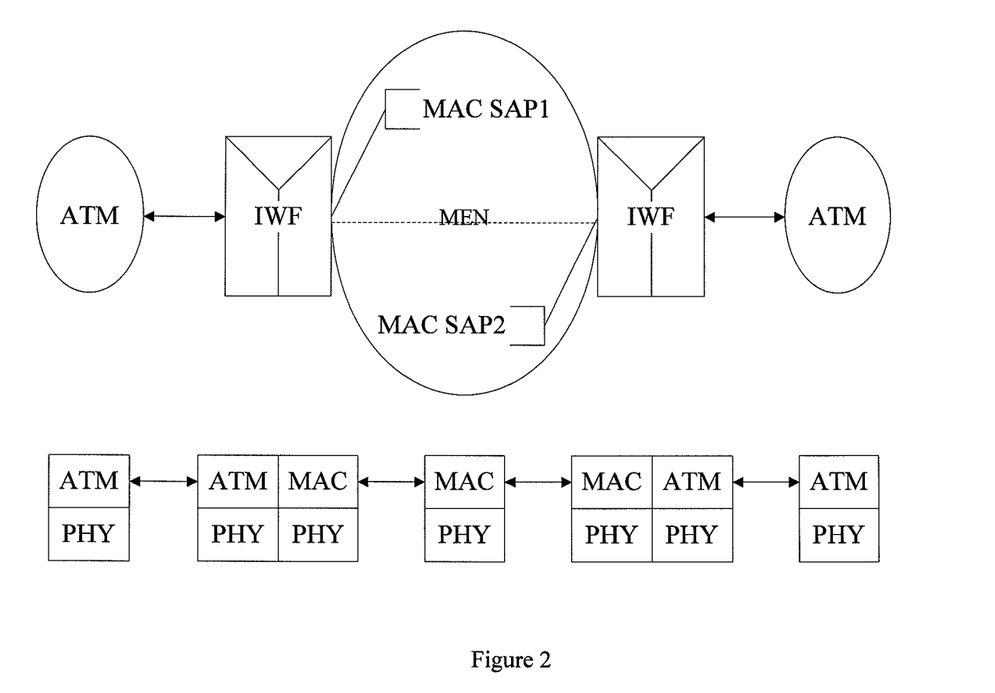
FIG. 2 shows a network emulation model in an embodiment of the present invention.

In an embodiment of the present invention, the IWF plays a very important role in the network interworking process. An IWF entity connects two different types of networks, for example, an ATM network and an Ethernet network. FIG. 2 shows the basic network emulation model in an embodiment of the present invention.

As shown in FIG. 2, at the edge of a MEN, a tunnel is constituted between two Media Access Control Service Access Points (MAC SAPs)—MAC SAP1 and MAC SAP2. A PW may be configured on the tunnel, which is also known as Ethernet virtual connection emulation, and a mapping relation is created between an ATM VPC/VCC and a PW. On the IWF entity at one side, the ATM VPC/VCC is mapped to the PW. Conversely, on the IWF entity at the other side, the PW is mapped to the ATM VPC/VCC, thus deriving an ATM VPC/VCC from the PW.

Figure 21:
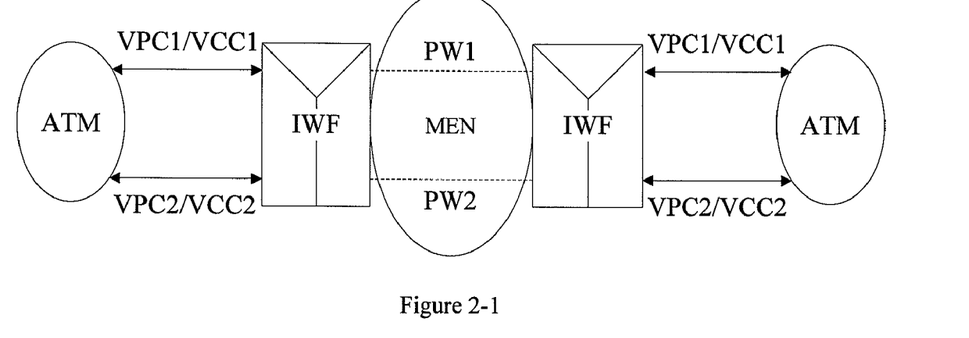
Figure 22:
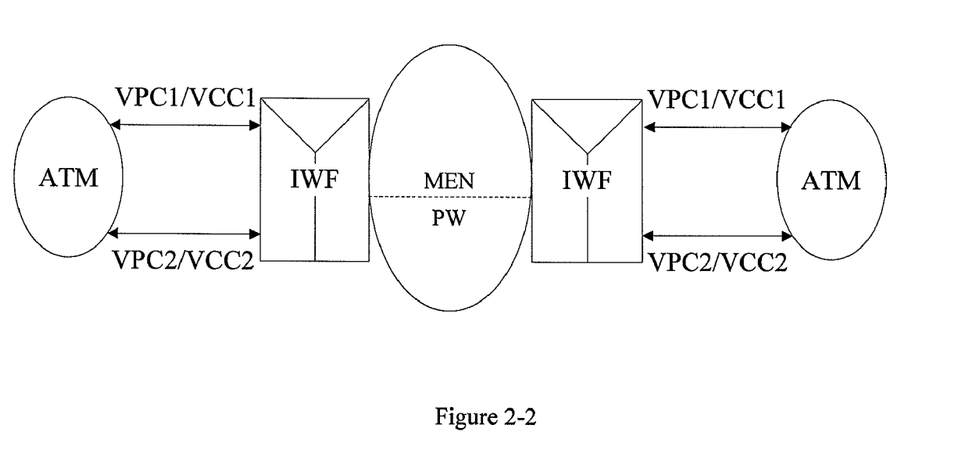

There are two mapping modes: one-to-one mode and N-to-one mode. FIG. 2-1 shows the network model of the one-to-one mode and FIG. 2-2 shows the network model of the N-to-one mode in an embodiment of the present invention.

As shown in FIG. 2-1, in the one-to-one mode, one PW bears only one VPC/VCC. As shown in FIG. 2-2, in the N-to-one mode, multiple VPCs/VCCs may be mapped to the same PW. The selection of the one-to-one mode or the N-to-one mode depends on the IWF entities at both sides, and is configured on the IWF entities.

A service is bidirectional. For ease of description, the IWF entities at both sides can be differentiated: one is a To-MEN IWF and the other is a To-ATM IWF. The To-MEN IWF receives an ATM cell, converts the ATM cell into an Ethernet frame format, and sends it to the Ethernet. The To-ATM IWF receives an Ethernet frame, converts the Ethernet frame into an ATM cell, and sends it to the ATM network.

In an embodiment of the present invention, the package format for different Ethernet frames is similar. Table 5 shows the structure of an 802.1-based Ethernet frame package. The word "packaging" herein implies two meanings: assembling ATM cells into an Ethernet frame that contains cell payload of ATM cells and other relevant information; and assembling the cell payload of ATM cells and other relevant information contained in an Ethernet frame back into ATM cells.

TABLE 5

Ethernet frame header
Interworking word (4 or 6 bytes)
Control word (optional) (4 bytes)
Payload (N bytes)
Frame Check Sequence (FCS) (4 bytes)

Table 2 shows the structure of an Ethernet frame header at the forepart of an Ethernet frame package shown in Table 5, where:

If the Ethernet frame is in the 802.1d format, the Ethernet frame header contains DA, SA, and LEN/TYPE.

If the Ethernet frame is in the 802.1q format, the Ethernet frame header contains DA, SA, C-TAG, and LEN/TYPE, in which C-TAG contains a TPID and a VLAN TAG.

If the Ethernet frame is in the 802.1ah format, the Ethernet frame header contains DA, SA, S-TAQ I-TAQ and LEN/TYPE, in which I-TAG contains a TPID and an I-SID.

As shown in Table 5, the interworking word, control word and payload information in an Ethernet frame serve to implement emulation in the Ethernet by means of a PW, as elaborated below:

(1) Interworking Word:

An interworking word contains an IW ID, and uniquely identifies a PW in a MEN. An interworking word can be determined in two ways:

In the case of 802.1d or 802.1q, a 6-byte interworking word is set at the end of an Ethernet frame header to uniquely identify a PW. The interworking word contains a LEN/TYPE field at the end of the frame header and a 4-byte IW ID that follows. Two virtual circuits in different directions may form a pair of bidirectional PW. The two PWs in the pair may have two different IW IDs. Table 5-1 and Table 5-2 show the setting of an interworking word in the case of 802.1d or 802.1q respectively.

TABLE 5-1

| | | 802.1d | | | |
| --- | --- | --- | --- | --- | --- |
| 6 bytes | 6 bytes | 6 bytes | | N bytes | 4 bytes |
| DA | SA | LEN/TYPE (2 bytes) | IW ID (4 bytes) | Payload | FCS |

TABLE 5-2

| | | | 802.1q | | | |
| --- | --- | --- | --- | --- | --- | --- |
| 6 bytes | 6 bytes | 4 bytes | 6 bytes | | N bytes | 4 bytes |
| DA | SA | C-TAG | LEN/TYPE (2 bytes) | IW ID (4 bytes) | Payload | FCS |

In the case of 802.1ah, as shown in Table 5-2, an I-TAG is used as an interworking word, and the 3-byte I-SID in the I-TAG is used as an IW ID. In this way, a PW mapping relation is created between the virtual connection information of the ATM network and the I-SID in the 802.1ah-based Ethernet frame I-TAQ as detailed in Table 5-3.

TABLE 5-3

| | | | 802.1ah | | |
|---|---|---|---|---|---|
| 6 bytes | 6 bytes | 4 bytes | 6 bytes | N bytes | 4 bytes |
| DA | SA | S-TAG | I-TAG<br>TPID and    I-SID<br>others     (3 bytes)<br>(3 bytes) | Payload | FCS |

As mentioned above, in the network model shown in FIG. 2, a tunnel is constituted between MAC SAP1 and MAC SAP2 at the edge of the MEN to create a mapping relation. The tunnel can be identified by the IW ID mentioned in Table 5-1, Table 5-2 and Table 5-3.

(2) Control Word:

A control word serves to determine the control contents related to payload. An ATM cell contains 53 bytes fixedly, and does not need to be fragmented before being packaged into an Ethernet. The format of a control word may be similar to the format of a PWE3, and contains: 4-bit forepart zero information, 6-bit reserved field, 6-bit LEN and 16-bit packet SN. If neither LEN nor SN is in use, the LEN and SN need to be set to zero.

Because the minimum length of an Ethernet frame is 64 bytes, zeros are sometimes filled into a LEN field to meet the minimum length. The SN serves to check integrity of an Ethernet frame. Supposing that the sequence number of frames starts from 1 in the To-MEN direction, the SN increases by 1 for every Ethernet frame sent; if SN=65535, the next SN starts over from 1.

(3) Payload Part:

The payload serves to package the ATM cell streams. For both one-to-one mode and N-to-one mode, two payload packaging modes are available for selection: single-cell package, and multi-cell package.

In the case of the one-to-one mode, the single-cell package format may be the format applied in the aforementioned first conventional art, namely, the format shown in Table 4-1. Likewise, the multi-cell package format is generated by repeating the package format of single cells in the payload area of an Ethernet frame. Such cells must belong to the same VPC or VCC; and the cell payload of the same VPC may have different VCCs.

In the case of the N-to-one mode, the single-cell package format may also be the format applied in the aforementioned first conventional art, namely, the format shown in Table 4-2. Likewise, the multi-cell package format is generated by repeating the package format of single cells in the payload area of an Ethernet frame. Such cells must belong to the same VPC or VCC; and the cell payload of the same VPC may have different VCCs. One PW may bear multiple ATM VPCs or VCCs.

As mentioned above, the IWF entity is connected with the ATM network and the Ethernet network in the process of network interworking. The To-MEN IWF receives an ATM cell, converts the ATM cell into an Ethernet frame format, and sends it to the Ethernet; the To-ATM IWF receives an Ethernet frame, converts the Ethernet frame into an ATM cell, and sends it to the ATM network.

Figure 3:
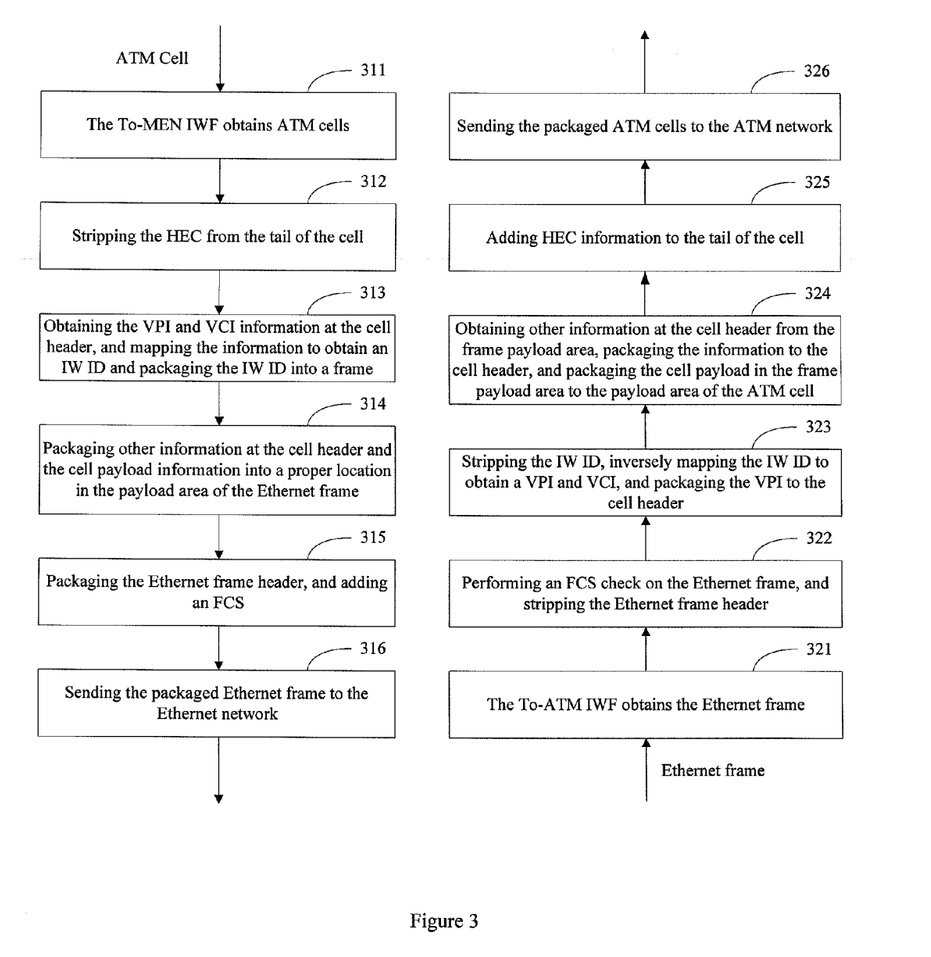
FIG. 3 is a flowchart of single-cell packaging in the one-to-one mode in an embodiment of the present invention.

FIG. 3 shows the process of packaging a single cell in the one-to-one mode, including a To-MEN IWF operation process and a To-ATM IWF operation process. In this embodiment, an one-to-one mapping mode applies. That is, the information combination of a VPI and VCI is mapped to an IW ID. After completion of mapping, the VPI information is not packaged into an Ethernet frame; instead, the cell information except the VPI information is packaged into an Ethernet frame. In the one-to-one mapping mode, it is appropriate no matter whether VCI information is packaged or not.

The To-MEN IWF operation process is detailed in steps 311-316.

Step 311: The To-MEN IWF obtains an ATM cell.

Step 312: The HEC information is stripped from the tail of the cell.

Step 313: The VPI and VCI information at the header of the cell is obtained, the VPI and VCI information is mapped to obtain an IW ID, and the interworking word corresponding to the IW ID is packaged into an Ethernet frame.

Step 314: The cell payload information and the information at the cell header except the VPI information is packaged into a proper location in the payload area of the Ethernet frame, as shown in Table 4-1.

Step 315: The Ethernet frame header is packaged, and an FCS is added.

Step 316: The Ethernet frame packaged in step 315 is sent to the Ethernet network.

The To-ATM IWF operation process is detailed in steps 321-326:

Step 321: The To-ATM IWF obtains an Ethernet frame.

Step 322: An FCS check is performed for the Ethernet frame; if the Ethernet frame is checked as correct, the Ethernet frame header is stripped; otherwise, the frame is discarded.

Step 323: The IW ID is stripped from the interworking word in the Ethernet frame, VPI and VCI information is obtained by inversely mapping the IW ID, and the VPI information is packaged to the header area of the ATM cell.

Step 324: The cell header information and the payload information which exist in the payload area of the Ethernet frame and correspond to the ATM cell is packaged into the header and payload area of the ATM cell, as shown in Table 1. The cell header information is the information about the cell header except the VPI information.

Step 325: HEC information is added to the tail of the cell.

Step 326: The ATM cell packaged in step 325 is sent to the ATM network.

In the process of packaging a single cell in the one-to-one mode shown in FIG. 3, the To-MEN IWF operation process described in steps 311-316 is inversed to the To-ATM IWF operation process described in steps 321-326.

Figure 4:
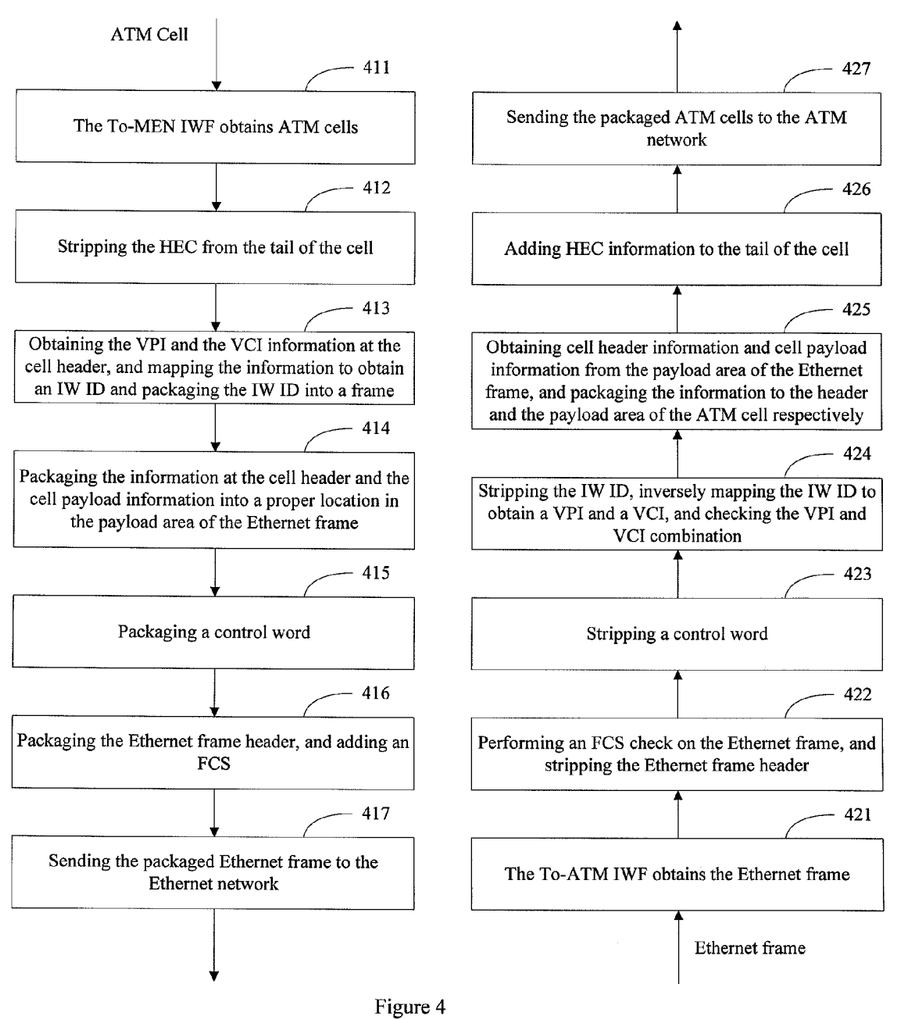
FIG. 4 is a packaging flowchart of a single cell in the N-to-one mode in an embodiment of the present invention.

FIG. 4 shows the process of packaging a single cell in the N-to-one mode, including a To-MEN IWF operation process and a To-ATM IWF operation process. In this embodiment, the N-to-one mapping mode is to map the virtual connection information set composed of different types of VPI and VCI information to an IW ID. After completion of mapping, all the VPI information, including the VPI and VCI information, is packaged into an Ethernet frame; accordingly, a check on the VPI and VCI combination is required at the time of reassembling the ATM cell from the Ethernet frame.

The To-MEN IWF operation process is detailed in steps 411-417.

Step 411: The To-MEN IWF obtains an ATM cell.

Step 412: The HEC information is stripped from the tail of the cell.

Step 413: The VPI and VCI information at the header of the cell is obtained, an IW ID is obtained by mapping the information, and the interworking word corresponding to the IW ID is packaged into an Ethernet frame.

Step 414: The cell header information and the cell payload information of the ATM cell is packaged into a proper location in the payload area of the Ethernet frame, as shown in Table 4-2.

Step 415: The control word is packaged into the Ethernet frame.

Step 416: The Ethernet frame header is packaged, and an FCS is added.

Step 417: The Ethernet frame packaged in step 416 is sent to the Ethernet network.

The To-ATM IWF operation process is detailed in steps 421-427.

Step 421: The To-ATM IWF obtains an Ethernet frame.

Step 422: An FCS check is performed for the Ethernet frame; if the Ethernet frame is checked as correct, the Ethernet frame header is stripped; otherwise, the frame is discarded.

Step 423: The control word is stripped.

Step 424: The IW ID is stripped from the interworking word in the Ethernet frame; a virtual connection information set that contains VPI and VCI information is obtained by inversely mapping the IW ID; the VPI and VCI information combination is checked therein, namely, to check whether the area corresponding to the ATM cell in the payload area of the Ethernet frame contains a VPI and VCI information combination identical to the VPI and VCI information combination obtained through inverse mapping in this step. If identical, the VPI and VCI combination check succeeds, and the process proceeds to step 425; otherwise, the VPI and VCI combination check fails, which indicates error of data transmission. In the case that the check fails, in view of the single-cell packaging, the single-cell Ethernet frame is discarded, and the process is completed.

Step 425: The cell header information and the cell payload information which exist in the payload area of the Ethernet frame and correspond to the ATM cell are packaged into the header and payload area of the ATM cell, as shown in Table 1.

Step 426: HEC information is added to the tail of the cell.

Step 427: The ATM cell packaged in step 426 is sent to the ATM network.

In the process of packaging a single cell in the N-to-one mode shown in FIG. 4, the To-MEN IWF operation process described in steps 411-417 is inverse to the To-ATM IWF operation process described in steps 421-427.

Compared with the process of packaging a single cell in the one-to-one mode shown in FIG. 3, the process of packaging a single cell in the N-to-one mode needs only to read rather than strip the VPI information at the header of the ATM cell, and then package the whole cell header; moreover, the process needs to read the VCI information at the header of the ATM cell, map the information to obtain an IW ID. In the process of converting an Ethernet frame to an ATM cell, it is necessary to map the stripped IW ID to obtain a VPI and perform a VPI check. Additionally, the control word needs to be packaged or stripped.

The process of packaging connected cells can be performed by repeating the single-cell packaging process in the payload area of the Ethernet frame.

Figure 5:
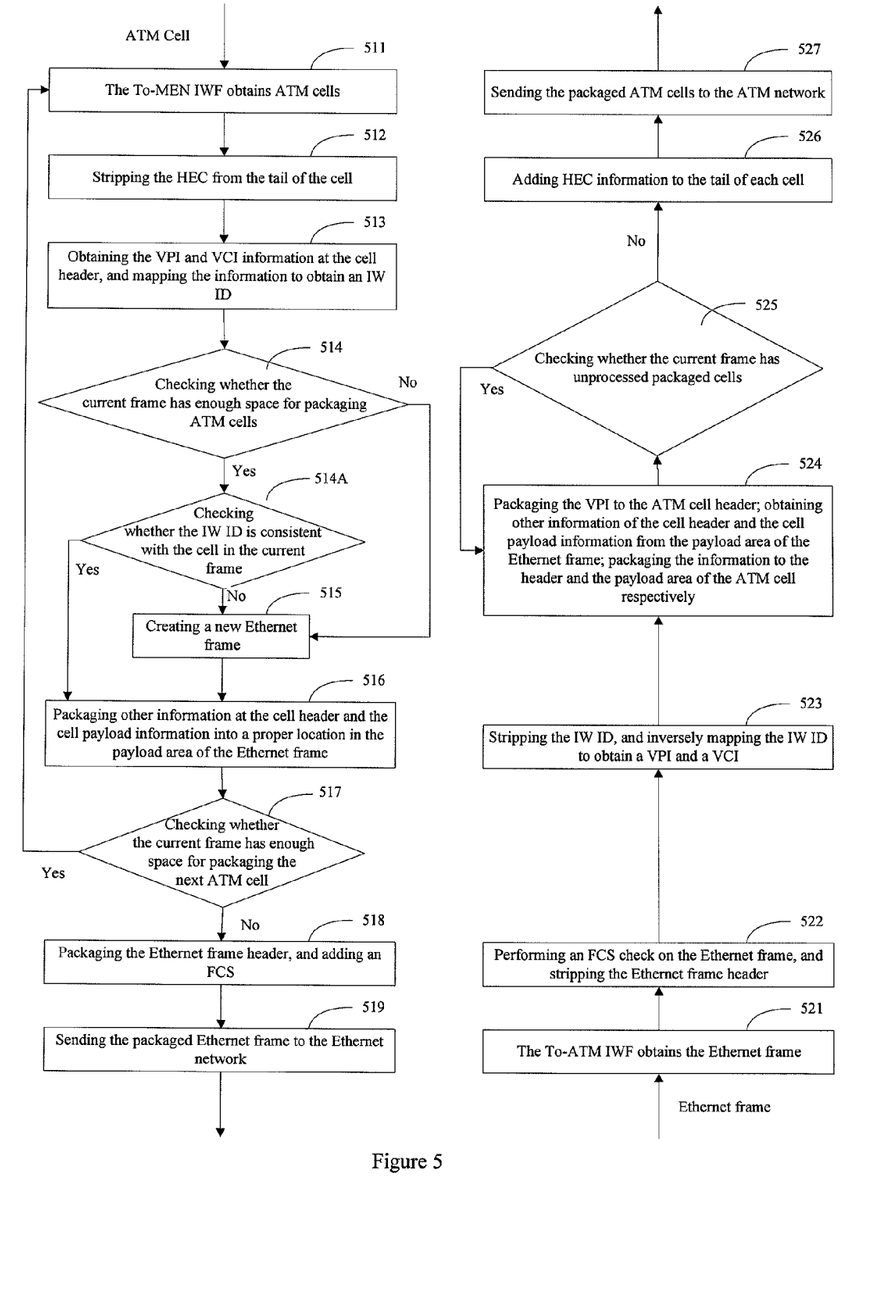
FIG. 5 is a packaging flowchart of connected cells in the one-to-one mode in an embodiment of the present invention.

FIG. 5 shows the process of packaging connected cells in the one-to-one mode, including a To-MEN IWF operation process and a To-ATM IWF operation process. In this embodiment, the one-to-one mapping mode is to map the virtual connection information set composed of multiple VPI and VCI information combinations to an IW ID, in which the VPI information in the virtual connection information set is the same but the VCI information may be the same or different. That is, among the multiple packaged cells, the VPI information is the same, but the VCI information may be the same or different. In this embodiment, after completion of mapping, the VPI information is not packaged into an Ethernet frame. Instead, the cell information except the VPI information is packaged into an Ethernet frame. In the one-to-one mapping mode, it is appropriate no matter whether VCI information is packaged or not. Accordingly, at the time of reassembling an ATM cell from the Ethernet frame, the VPI information value is the same among multiple assembled ATM cells.

The To-MEN IWF operation process is detailed in steps 511-519.

Step 511: The To-MEN IWF obtains an ATM cell.

Step 512: The HEC information is stripped from the tail of the cell.

Step 513: The VPI and VCI information at the cell header is obtained, and an IW ID is obtained by mapping the information.

Step 514: It is judged whether the current Ethernet frame has enough space for packaging the ATM cell. If enough space is available for packaging the ATM cell, step 514A is performed; otherwise, step 515 is performed, namely, a new Ethernet frame for packaging the cell is created.

Step 514A: It is judged whether IW ID obtained in step 513 is identical to the IW ID of the cell packaged in the current Ethernet frame: if identical, the interworking word corresponding to the IW ID is packaged into the Ethernet frame, and step 516 is performed. Otherwise, step 515 is performed, namely, a new Ethernet frame to package cells is created, the interworking word corresponding to the IW ID is packaged into the new Ethernet frame, and then step 516 is performed.

"Judging" in this step refers to the circumstance that the current Ethernet frame contains packaged ATM cells. If the current Ethernet frame is empty, no judging is required and the Ethernet frame may be treated in the same way as the case of the IW ID. In this step, if the judgment result is that the IW ID is different, another judgment may be made to judge whether an Ethernet frame corresponding to the obtained IW ID exists. If so, the current ATM cell may be packaged into an Ethernet frame, and the interworking word corresponding to the IW ID is packaged into an Ethernet frame, which is followed by step 516.

Step 516: The cell payload information and the information at the cell header except the VPI information is packaged into a proper location in the payload area of the Ethernet frame, as shown in Table 4-1.

Step 517: It is judged whether the current Ethernet frame has enough space for packaging the next ATM cell. If enough space is available for packaging the next ATM cell, the process returns to step 511; otherwise, step 518 is performed.

Step 518: The Ethernet frame header is packaged, and an FCS is added.

Step 519: The Ethernet frame packaged in step 518 is sent to the network at the Ethernet side.

The To-ATM IWF operation process is detailed in steps 521-528.

Step 521: The To-ATM IWF obtains an Ethernet frame.

Step 522: An FCS check is performed for the Ethernet frame; if the Ethernet frame is checked as correct, the Ethernet frame header is stripped; otherwise, the frame is discarded.

Step 523: The IW ID from the interworking word in the Ethernet frame is stripped, and VPI and VCI information of the ATM cell is obtained by inversely mapping the IW ID.

Step 524: The VPI information obtained in step 523 is packaged into the header area of an ATM cell; the cell header information and the cell payload information which exist in the payload area of the Ethernet frame and correspond to the ATM cell is packaged into the header and payload area of the ATM cell, as shown in Table 1. The cell header information is the information about the cell header except the VPI information.

Step 525: It is judged whether the current Ethernet frame contains any unprocessed packaged ATM cell: if the current Ethernet frame contains any unprocessed packaged ATM cell, the process returns to step 524 to process the next cell; otherwise, performing step 526 is performed.

Step 526: HEC information is added to the tail of each processed ATM cell.

Step 527: The ATM cells packaged in step 526 is sent to the ATM network.

In the process of packaging connected cells in the one-to-one mode shown in FIG. 5, the To-MEN IWF operation process described in steps 511-519 is inverse to the To-ATM IWF operation process described in steps 521-527.

Compared with the process of packaging a single cell in the one-to-one mode shown in FIG. 3, in the process of packaging connected cells in the one-to-one mode in this embodiment, the To-MEN IWF packages multiple obtained ATM cells into an Ethernet frame, and sends them to the network at the Ethernet side. The To-ATM IWF handles multiple cells in the obtained Ethernet frame to obtain multiple ATM cells, and send the ATM cells to the ATM network. When the To-MEN IWF packages multiple obtained ATM cells into an Ethernet frame, only the ATM cells which have the same IW ID or VPI information can be packaged into the same Ethernet frame.

Figure 6:
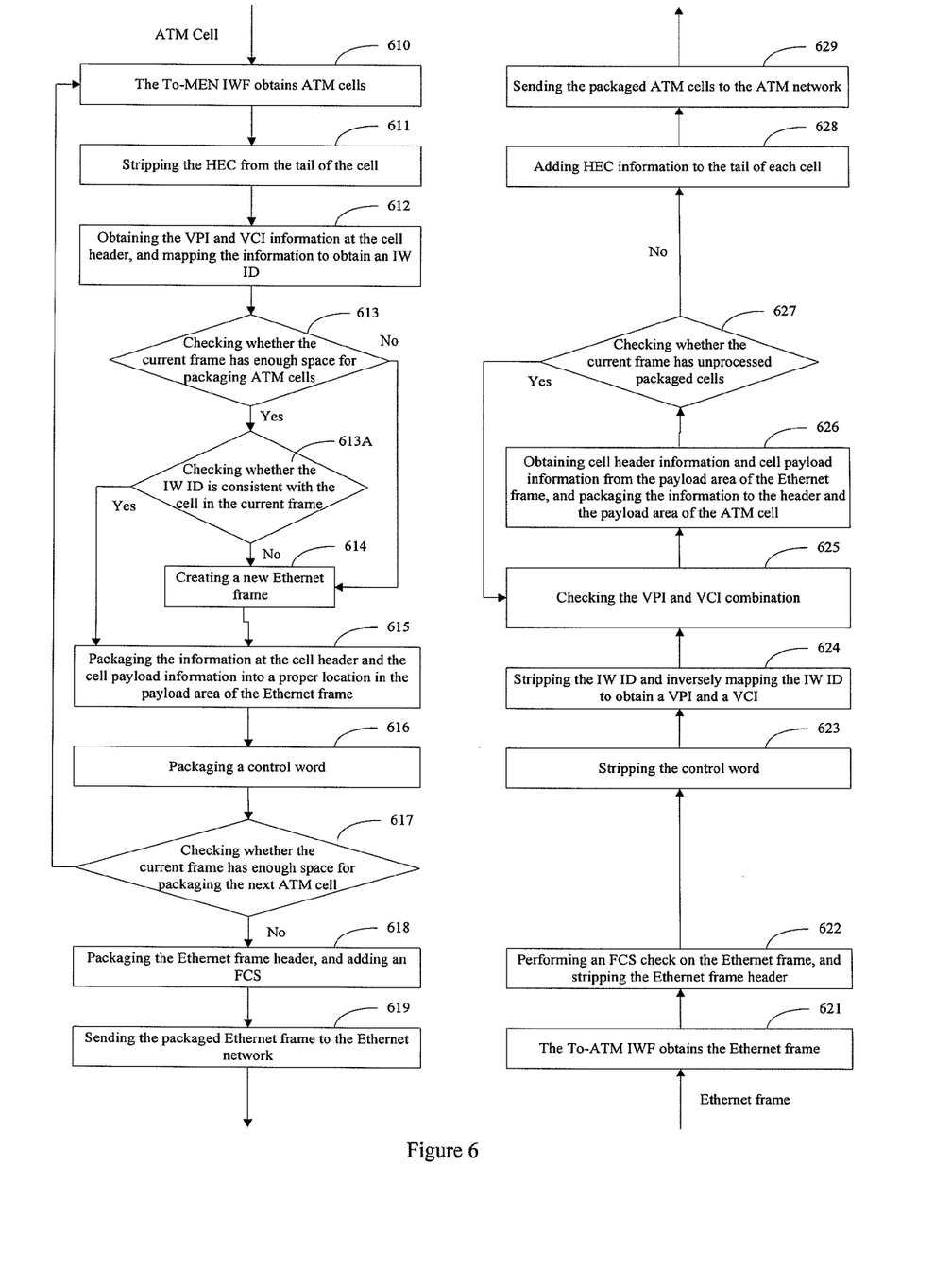
FIG. 6 is a packaging flowchart of connected cells in the N-to-one mode in an embodiment of the present invention.

FIG. 6 shows the process of packaging connected cells in the N-to-one mode, including a To-MEN IWF operation process and a To-ATM IWF operation process. In this embodiment, the N-to-one mapping mode is to map the virtual connection information set composed of multiple different VPI and VCI information combinations to an IW ID. It is possible that multiple VPI and VCI information values exist in the virtual connection information set. Therefore, in this embodiment, all the cell information, including the VPI and VCI information, is packaged into an Ethernet frame after completion of mapping; accordingly, a check on the VPI and VCI combination is required at the time of reassembling the ATM cell from the Ethernet frame.

The To-MEN IWF operation process is detailed in steps 610-619.

Step 610: The To-MEN IWF obtains an ATM cell.

Step 611: The HEC is stripped from the tail of the cell.

Step 612: The VPI and VCI information is stripped from the cell header, and an IW ID is obtained by mapping the VPI and VCI information.

Step 613: It is judged whether the current Ethernet frame has enough space for packaging the ATM cell. If enough space is available for packaging the ATM cell, step 613A is performed; otherwise, step 614 is performed, namely, a new Ethernet frame for packaging the cell is created.

Step 613A: It is judged whether IW ID obtained in step 612 is identical to the IW ID of the cell packaged in the current Ethernet frame: if identical, the interworking word corresponding to the IW ID is packaged into the Ethernet frame, and step 614 is performed. Otherwise, step 614 is performed, namely, a new Ethernet frame to package cells is created, the interworking word corresponding to the IW ID is packaged into the new Ethernet frame, and step 615 is performed.

The "judging" in this step is the same as that in step 514A in FIG. 5.

Step 615: The cell header information and the cell payload information is packaged into a proper location in the payload area of the Ethernet frame, as shown in Table 4-2.

Step 616: The control word is packaged into the Ethernet frame.

Step 617: It is judged whether the current Ethernet frame has enough space for packaging the next ATM cell. If enough space is available for packaging the next ATM cell, the process returns to step 610; otherwise, step 618 is performed.

Step 618: The Ethernet frame header is packaged, and an FCS is added.

Step 619: The Ethernet frame packaged in step 618 is sent to the network at the Ethernet side.

The To-ATM IWF operation process is detailed in steps 621-629.

Step 621: The To-ATM IWF obtains an Ethernet frame.

Step 622: An FCS check is performed for the Ethernet frame; if the Ethernet frame is checked as correct, the Ethernet frame header is stripped; otherwise, the frame is discarded.

Step 623: The control word is stripped.

Step 624: The IW ID is stripped from the interworking word in the Ethernet frame, and a virtual connection information set which contains VPI and VCI information of the multiple ATM cells is obtained by inversely mapping the IW ID.

Step 625: A VPI and VCI information combination is retrieved from the virtual connection information set obtained in step 624 to perform a check on the VPI and VCI combination. That is, to check whether the area corresponding to the ATM cell in the payload area of the Ethernet frame contains a VPI and VCI information combination corresponding to the VPI and VCI information combination retrieved from virtual connection information set. If contains, the VPI and VCI combination check succeeds, and the process proceeds to step 626; otherwise, the VPI and VCI combination check fails. In the case that the check fails, the ATM cell corresponding to the VPI and VCI information combination needs to be discarded before step 627 which judges whether any remaining ATM cell needs to be handled.

Step 626: The header information and the payload information of the ATM cell corresponding to the VPI and VCI information combination mentioned in step 625 is obtained from the area corresponding to the ATM cell in the payload area of the Ethernet frame, and the obtained information is packaged into the header and payload area of the ATM cell, as shown in Table 1.

Step 627: It is judged whether the current Ethernet frame contains any unprocessed packaged ATM cell: if so, the process returns to step 625 to process the next cell; otherwise, step 628 is performed.

Step 628: HEC information is added to the tail of each processed ATM cell.

Step 629: The ATM cells packaged in step 628 is sent to the ATM network.

In the process of packaging connected cells in the N-to-one mode shown in FIG. 6, the To-MEN IWF operation process described in steps 610-619 is inverse to the To-ATM IWF operation process described in steps 621-629.

Compared with the process of packaging a single cell in the N-to-one mode shown in FIG. 4, in the process of packaging connected cells in the one-to-one mode in this embodiment, the To-MEN IWF packages multiple obtained ATM cells into an Ethernet frame, and sends them to the network at the Ethernet side. The To-ATM IWF handles multiple cells in the obtained Ethernet frame to obtain multiple ATM cells, and send the ATM cells to the ATM network. When the To-MEN IWF packages multiple obtained ATM cells into an Ethernet frame, only the ATM cells which have the same IW ID or VPI information can be packaged into the same Ethernet frame.

In an embodiment of the present invention, a mapping relation is also created between the network congestion information of the ATM network and the network congestion information of the Ethernet network in the case of network congestion.

The VLAN TAG field of the 802.1q-based Ethernet frame contains a 3-bit user priority value, which provides service priority levels 0-7 for different service types on the Ethernet. Therefore, a data frame may be assigned a priority level, and arranged into a transmission queue, with the priority level controlling the delay of sending the frame and the delay of network transmission. The CLP value at the header of the ATM cell serves the purpose of congestion control. The CLP value "1" means to discard the cell. Therefore, a corresponding relation between the priority level of the Ethernet frame and the CLP of the ATM cell may be configured on the IWF as required, so that the network congestion state may be notified to different networks in time, thus implementing congestion control between an ATM network and an Ethernet network.

An embodiment of the present invention provides an apparatus for an Ethernet to bear ATM cells for the purposes of network emulation and interworking.

Figure 7:
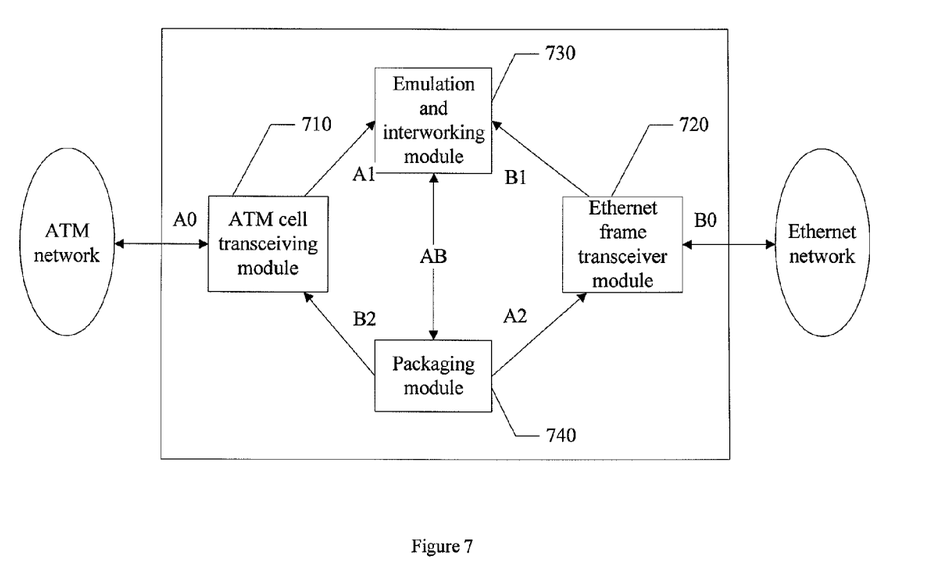
FIG. 7 shows a structure and connection of a network emulation apparatus in an embodiment of the present invention.

FIG. 7 shows the structure and connection of a network emulation apparatus in an embodiment of the present invention. As shown in FIG. 7, the apparatus is located between an ATM network and an Ethernet network, and contains an ATM cell transceiver module 710, and Ethernet frame transceiver module 720, an emulation and interworking module 730, and a packaging module 740, in which:

The ATM cell transceiver module 710 is connected with an external ATM network to receive and send ATM cells, and is connected with the emulation and interworking module 730, and the packaging module 740.

The Ethernet frame transceiver module 720 is connected with the external Ethernet network to receive and send Ethernet frames, and is connected with the emulation and interworking module 730, and the packaging module 740.

The emulation and interworking module 730 is connected with the packaging module 740 to perform information interaction.

After receiving an ATM cell from the ATM network, the ATM cell transceiver module 710 sends the ATM cell to an emulation and interworking module 730 connected with it. The emulation and interworking module 730 handles the received ATM cell and sends it to a packaging module 740 for packaging. The packaging module 740 packages the received ATM cell into an Ethernet frame, and sends the Ethernet frame to an Ethernet frame transceiver module 720. The Ethernet frame transceiver module 720 sends the Ethernet frame to the Ethernet network. The foregoing process is illustrated by A0-A1-AB-A2-B0 in FIG. 7.

After receiving an Ethernet frame from the Ethernet network, the Ethernet frame transceiver module 720 sends the Ethernet frame to an emulation and interworking module 730 connected with it. The emulation and interworking module 730 handles the received Ethernet frame and sends it to a packaging module 740 for packaging. The packaging module 740 packages the received Ethernet frame into an ATM cell, and sends the ATM cell to an ATM cell transceiver module 710. The ATM cell transceiver module 710 sends the ATM cell to the ATM network. The foregoing process is illustrated by B0-B1-AB-B2-A0 in FIG. 7.

In the foregoing apparatus provided in an embodiment of the present invention, the emulation and interworking module 730 is a main control module, and controls the process through interaction with other three modules in the apparatus. The emulation and interworking module 730 serves the functions of: resolving data packet information, mapping and judging. The function of resolving data packet information covers the operations of stripping and obtaining the information in the ATM cell or Ethernet frame and other relevant operations. The mapping function covers mapping from the virtual connection information in an ATM cell to the IW ID set in an Ethernet frame, and inverse mapping. The judging function covers virtual connection check, IW ID comparison, and judgment on the packaging space in an Ethernet frame.

After receiving an ATM cell sent from an ATM cell transceiver module 710, the emulation and interworking module 730 strips the HEC at the cell tail, obtains the VPI and VCI information at the cell header, and maps the information to an IW ID. After checking the sufficiency of the packaging space and existence of an Ethernet frame corresponding to the IW ID obtained from mapping, the emulation and interworking module determines the Ethernet frame into which the ATM cell information is packaged, and then sends the ATM cell information required for packaging an Ethernet frame to the packaging module 740 to package an Ethernet frame. After receiving an Ethernet frame from the Ethernet frame transceiver module 720, the emulation and interworking module 730 performs an FCS check for the Ethernet frame. After the FCS check succeeds, the emulation and interworking module 730 strips the Ethernet frame header (and, in the case of N-to-one mapping mode, strips the control word), strips the IW ID, and inversely maps the IW ID to obtain VPI and VCI information. When necessary (for example, in the case of the N-to-one mapping mode), the emulation and interworking module checks the VPI and VCI information combination. If the check succeeds, sends the Ethernet frame information required for packaging ATM cells to the packaging module 740 for packaging the ATM cells.

The emulation and interworking module 730 obtains the information required for packaging through interaction with the packaging module 740, and performs relevant judgment. Especially, in the case of packaging connected cells, the emulation and interworking module 730 may judge whether to handle the next received ATM cell, or judge whether to package the next ATM cell according to the Ethernet frame information.

In the apparatus provided in an embodiment of the present invention, the packaging module 740 packages the corresponding data packets according to the received information. After receiving ATM cell information, the packaging module packages the ATM cell information into an Ethernet frame. In the case of the N-to-one mapping mode, the packaging module needs to package a control word. If determining that no more ATM cell information needs to be packaged, the packaging module packages the Ethernet frame header and adds an FCS, and sends the Ethernet frame to the Ethernet frame transceiver module 720. After receiving Ethernet frame information, the packaging module packages the Ethernet frame information into an ATM cell. If determining that the ATM cells in the current Ethernet frame are handled completely, the packaging module adds HEC information to the cell tail, and sends the packaged ATM cells to the ATM cell transceiver module 710.

An embodiment of the present invention provides a method and an apparatus for an Ethernet to bear ATM cells, in order to enable an ATM network to perform ATM emulation in a MEN. The embodiments of the present invention are based on the PW mapping technology, convert ATM cells into an Ethernet frame, and send the Ethernet frame to the Ethernet network. At the Ethernet side, the Ethernet frame is converted to ATM cells, and sent to the ATM network. Moreover, the present invention specifies the method of conversion between ATM cells and an Ethernet frame, and the corresponding format. The embodiments of the present invention implement network interworking on the data link layer (layer 2) independently of the upper-layer protocol. That is, the interworking is completely transparent to the upper-layer protocol type, thus facilitating the user.

The embodiments described above are only preferred embodiments and are not intended to limit the protection scope of the present invention.

What is claimed is:

1. A method for an Ethernet network to bear Asynchronous Transfer Mode (ATM) cells, comprising:
   receiving a first ATM cell from an ATM network;
   stripping a first Header Error Control (HEC) information from a tail of the first ATM cell;
   mapping a first ATM virtual connection information in a cell header of the first ATM cell to a first interworking identifier (IW ID);
   judging whether a current Ethernet frame has enough space for packaging the first ATM cell;
   judging whether the first IW ID obtained from the mapping is identical to a second IW ID in a third ATM cell packaged in the current Ethernet frame if enough space is available in the current Ethernet frame for packaging the first ATM cell;
   packaging a first interworking word corresponding to the first IW ID obtained from the mapping operation into the current Ethernet frame, and packaging first cell header information and first cell payload information of the received first ATM cell into a payload area of the current Ethernet frame if the first IW ID obtained from the mapping operation is identical to the second IW ID in the third ATM cell packaged in the current Ethernet frame;
   packaging a first Ethernet frame header and adding a first Frame Check Sequence (FCS) into the current Ethernet frame;
   and
   sending the packaged current Ethernet frame over the Ethernet network.

2. The method of claim 1, wherein the first ATM virtual connection information contains a first Virtual Path Identifier (VPI) and a first Virtual Channel Identifier (VCI).

3. The method of claim 2, wherein the first cell header information of the received first ATM cell packaged into the payload area of the current Ethernet frame is information at the cell header of the first ATM cell except the first VPI;
   the step of mapping the first ATM virtual connection information in the received first ATM cell to the first IW ID comprises:
   mapping the first VPI and first VCI to the first IW ID.

4. The method of claim 3, further comprising:
   receiving a first Ethernet frame from the Ethernet network;
   performing an FCS check for the first Ethernet frame;
   stripping a third Ethernet frame header from the first Ethernet frame if the first Ethernet frame is checked as correct;
   stripping a third IW ID from a third interworking word carried in the first Ethernet frame;
   obtaining a second ATM virtual connection information of a second ATM cell by inversely mapping the third IW ID stripped from the first Ethernet frame, wherein the second ATM virtual connection information obtained by the inversely mapping contains a second VPI and a second VCI;
   packaging the second VPI of the second ATM virtual connection information obtained by the inversely mapping into a header area of the second ATM cell;
   packaging second cell header information and second cell payload information which exist in the payload area of the first Ethernet frame and correspond to the second ATM cell into the header area of the second ATM cell and a payload area of the second ATM cell respectively, wherein the second cell header information packaged into the header area of the second ATM cell is information about the cell header of the second ATM cell except the second VPI;
   adding a second HEC information to a tail of the packaged second ATM cell; and then
   sending the second ATM cell to the ATM network.

5. The method of claim 4, before the step of adding the second HEC information to the tail of the packaged second ATM cell, further comprising:
   judging whether the first Ethernet frame received from the Ethernet network contains any unprocessed second ATM cell;
   returning to the step of packaging the second VPI of the second ATM virtual connection information obtained by the inversely mapping into the header area of the second ATM cell if the first Ethernet frame received from the Ethernet network contains any unprocessed second ATM cell;
   performing the step of adding the second HEC information to the tail of the packaged second ATM cell if the first Ethernet frame received from the Ethernet network does not contain any unprocessed second ATM cell.

6. The method of claim 2, after the step of packaging the first cell header information and the first cell payload information of the received first ATM cell into the payload area of the current Ethernet frame, further comprising:
   adding a first control word into the current Ethernet frame, wherein the first control word is a field of the current Ethernet frame that contains a payload length and a bit packet sequence number (SN).

7. The method of claim 3 or claim 6, further comprising:
   creating a new Ethernet frame for packaging the first ATM cell if the current Ethernet frame has no enough space for packaging the first ATM cell or if enough space is available in the current Ethernet frame for packaging the first ATM cell but the first IW ID obtained from the mapping is not identical to the second IW ID in the third ATM cell packaged in the current Ethernet frame;
   packaging the first interworking word corresponding to the first IW ID obtained from the mapping operation into the new Ethernet frame, and packaging the first cell header information and the first cell payload information of the received first ATM cell into a payload area of the new Ethernet frame;
   packaging a second Ethernet frame header and adding a second FCS into the new Ethernet frame; and
   sending the packaged new Ethernet frame over the Ethernet network.

8. The method of claim 7, after the step of packaging the first interworking word corresponding to the first IW ID obtained from the mapping operation into the new Ethernet frame and packaging the cell header information and cell payload information of the received first ATM cell into the payload area of the new Ethernet frame, and before the step of packaging the second Ethernet frame header and adding the second FCS into the new Ethernet frame, further comprising:
   judging whether the new Ethernet frame has enough space for packaging next first ATM cell;

returning to the step of receiving the first ATM cell from the ATM network if enough space is available in the new Ethernet frame for packaging the next first ATM cell; and performing the step of packaging the second Ethernet frame header and adding the second FCS into the new Ethernet frame if the new Ethernet frame has no enough space for packaging the next first ATM cell.

9. The method of claim 3 or claim 6, after the step of packaging the first interworking word corresponding to the first IW ID obtained from the mapping operation into the current Ethernet frame, and packaging the cell header information and cell payload information of the received first ATM cell into the payload area of the current Ethernet frame, and before the step of packaging the first Ethernet frame header and adding the first FCS into the current Ethernet frame, further comprising:

judging whether the current Ethernet frame has enough space for packaging next first ATM cell;

returning to the step of receiving the first ATM cell from the ATM network if enough space is available in the current Ethernet frame for packaging the next first ATM cell; and performing the step of packaging the first Ethernet frame header and adding the first FCS into the current Ethernet frame if the current Ethernet frame has no enough space for packaging the next first ATM cell.

10. The method of claim 6, further comprising:

receiving second Ethernet frame from the Ethernet network;

performing an FCS check for the second Ethernet frame;

stripping a forth Ethernet frame header from the second Ethernet frame if the second Ethernet frame is checked as correct;

stripping a second control word from the second Ethernet frame;

stripping a forth IW ID from a forth interworking word carried in the second Ethernet frame;

obtaining an ATM virtual connection information set which contains VPIs and VCIs of multiple second ATM cells by inversely mapping the forth IW ID stripped from the received Ethernet frame;

retrieving a VPI and VCI combination of one of the multiple second ATM cells from the obtained ATM virtual connection information set;

checking whether a payload area of the second Ethernet frame contains a first VPI and VCI combination corresponding to the VPI and VCI combination retrieved from the obtained ATM virtual connection information set;

obtaining third cell header information and third cell payload information of a second ATM cell corresponding to the first VPI and VCI combination from the payload area of the second Ethernet frame if the payload area of the second Ethernet frame contains the first VPI and VCI combination corresponding to the VPI and VCI combination retrieved from the obtained ATM virtual connection information set;

packaging the third cell header information and the third cell payload information obtained from the payload area of the second Ethernet frame into header and payload area of the second ATM cell respectively;

adding a third HEC information to a tail of the packaged second ATM cell; and then sending the second ATM cell to the ATM network.

11. The method of claim 10, before the step of adding the third HEC information to the tail of the packaged second ATM cell, further comprising:

judging whether the second Ethernet frame received from the Ethernet network contains any unprocessed second ATM cell;

returning to the step of checking whether the payload area of the second Ethernet frame contains the first VPI and VCI combination of the second ATM cell corresponding to the VPI and VCI combination retrieved from the obtained ATM virtual connection information set if the second Ethernet frame received from the Ethernet network contains any unprocessed second ATM cell;

performing the step of adding the third HEC information to the tail of the packaged second ATM cell if the second Ethernet frame received from the Ethernet network does not contain any unprocessed second ATM cell.

12. An apparatus for an Ethernet network to bear Asynchronous Transfer Mode (ATM) cells, comprising:

means for receiving a first ATM cell from an ATM network;

means for stripping a first Header Error Control (HEC) information from a tail of the first ATM cell;

means for mapping a first ATM virtual connection information in a cell header of the first ATM cell to a first interworking identifier (IW ID), wherein the first ATM virtual connection information contains a first Virtual Path Identifier (VPI) and a first Virtual Channel Identifier (VCI);

means for judging whether a current Ethernet frame has enough space for packaging the first ATM cell;

means for judging whether the first IW ID obtained from the mapping is identical to a second IW ID in a third ATM cell packaged in the current Ethernet frame if enough space is available in the current Ethernet frame for packaging the first ATM cell;

means for packaging a first interworking word corresponding to the first IW ID obtained from the mapping operation into the current Ethernet frame, and packaging first cell header information and first cell payload information of the received first ATM cell into a payload area of the current Ethernet frame if the first IW ID obtained from the mapping is identical to the second IW ID in the third ATM cell packaged in the current Ethernet frame;

means for packaging a first Ethernet frame header and adding a first Frame Check Sequence (FCS) into the current Ethernet frame; and means for transmitting the packaged current Ethernet frame over the Ethernet network.

13. The apparatus of claim 12, wherein the first cell header information of the received first ATM cell packaged into the payload area of the current Ethernet frame is information at the cell header of the first ATM cell except the first VPI.

14. The apparatus of claim 13, further comprising:

means for receiving a first Ethernet frame from the Ethernet network;

means for performing an FCS check for the first Ethernet frame;

means for stripping a third Ethernet frame header from the first Ethernet frame if the first Ethernet frame is checked as correct;

means for stripping a third IW ID from a third interworking word carried in the first Ethernet frame;

means for obtaining a second ATM virtual connection information of a second ATM cell by inversely mapping the third IW ID stripped from the first Ethernet frame, wherein the second ATM virtual connection information obtained by the inversely mapping contains a second VPI and a second VCI;

means for packaging the second VPI of the second ATM virtual connection information obtained by the inversely mapping into a header area of the second ATM cell;

means for packaging second cell header information and second cell payload information which exist in the payload area of the first Ethernet frame and correspond to the second ATM cell into the header area of the second ATM cell and a payload area of the second ATM cell respectively, wherein the second cell header information packaged into the header area of the second ATM cell is information about the cell header of the second ATM cell except the second VPI;

means for adding a second HEC information to a tail of the packaged second ATM cell; and then means for sending the second ATM cell to the ATM network.

15. The apparatus of claim 12, further comprising:

means for adding a first control word into the current Ethernet frame, wherein the first control word is a field of the current Ethernet frame that contains a payload length and a bit packet sequence number (SN).

16. The apparatus of claim 13 or claim 15, further comprising:

means for creating a new Ethernet frame for packaging the first ATM cell if the current Ethernet frame has no enough space for packaging the first ATM cell or if enough space is available in the current Ethernet frame for packaging the first ATM cell but the first IW ID obtained from the mapping is not identical to the second IW ID in the third ATM cell packaged in the current Ethernet frame;

means for packaging the first interworking word corresponding to the first IW ID obtained from the mapping operation into the new Ethernet frame, and packaging the first cell header information and the first cell payload information of the received first ATM cell into a payload area of the new Ethernet frame;

means for packaging a second Ethernet frame header and adding a second FCS into the new Ethernet frame; and means for sending the packaged new Ethernet frame over the Ethernet network.

17. The apparatus of claim 15, further comprising:

means for receiving second Ethernet frame from the Ethernet network;

means for performing an FCS check for the second Ethernet frame;

means for stripping a forth Ethernet frame header from the second Ethernet frame if the second Ethernet frame is checked as correct;

means for stripping a second control word from the second Ethernet frame;

means for stripping a forth IW ID from a forth interworking word carried in the second Ethernet frame;

means for obtaining an ATM virtual connection information set which contains VPIs and VCIs of multiple second ATM cells by inversely mapping the forth IW ID stripped from the received Ethernet frame;

means for retrieving a VPI and VCI combination of one of the multiple second ATM cells from the obtained ATM virtual connection information set;

means for checking whether a payload area of the second Ethernet frame contains a first VPI and VCI combination corresponding to the VPI and VCI combination retrieved from the obtained ATM virtual connection information set;

means for obtaining third cell header information and third cell payload information of a second ATM cell corresponding to the first VPI and VCI combination from the payload area of the second Ethernet frame if the payload area of the second Ethernet frame contains the first VPI and VCI combination corresponding to the VPI and VCI combination retrieved from the obtained ATM virtual connection information set;

means for packaging the third cell header information and the third cell payload information obtained from the payload area of the second Ethernet frame into header and payload area of the second ATM cell respectively;

means for adding a third HEC information to a tail of the packaged second ATM cell; and then means for sending the second ATM cell to the ATM network.

18. A network system for an Ethernet to bear Asynchronous Transfer Mode (ATM) cells, comprising:

an Ethernet network;

a first ATM network and a second ATM network communicating with each other over the Ethernet network;

a first apparatus located between the first ATM network and the Ethernet network, and comprising:

means for receiving a first ATM cell from the first ATM network;

means for stripping a first Header Error Control (HEC) information from a tail of the first ATM cell;

means for mapping a first Virtual Path Identifier, VPI, and a first Virtual Channel Identifier (VCI) in a cell header of the first ATM cell to a first interworking identifier, IW ID;

means for judging whether a current Ethernet frame has enough space for packaging the first ATM cell;

means for judging whether the first 1W ID obtained from the mapping is identical to a second IW ID in a third ATM cell packaged in the current Ethernet frame if enough space is available in the current Ethernet frame for packaging the first ATM cell;

means for packaging a first interworking word corresponding to the first IW ID obtained from the mapping operation into the current Ethernet frame, and packaging first cell header information and first cell payload information of the received first ATM cell into a payload area of the current Ethernet frame if the first IW ID obtained from the mapping is identical to the second IW ID in the third ATM cell packaged in the current Ethernet frame;

means for packaging a first Ethernet frame header and adding a first Frame Check Sequence (FCS) into the current Ethernet frame; and means for transmitting the packaged current Ethernet frame over the Ethernet network; and a second apparatus located between the second ATM network and the Ethernet network, and comprising:

means for receiving the current Ethernet frame from the Ethernet network;

means for performing an FCS check for the current Ethernet frame;

means for stripping the first Ethernet frame header from the current Ethernet frame if the current Ethernet frame is checked as correct;

means for stripping the first IW ID from the first interworking word carried in the current Ethernet frame;

means for inversely mapping the first IW ID to the first VPI and the VCI;

means for packaging the first VPI into a header area of a second ATM cell;

means for packaging the first cell header information except the first VPI and the first cell payload information which exist in the payload area of the current Ethernet frame and correspond to the first ATM cell into the header area of the second ATM cell and a payload area of the second ATM cell respectively;

means for adding a second HEC information to a tail of the packaged second ATM cell; and means for sending the second ATM cell to the second ATM network.

* * * * *